(12) United States Patent
Nikafrooz et al.

(10) Patent No.: US 12,055,988 B1
(45) Date of Patent: Aug. 6, 2024

(54) MEMORY THERMAL PROTECTION

(71) Applicant: Apple Inc., Cupertino, CA (US)

(72) Inventors: Negin Nikafrooz, Cupertino, CA (US); Reza Arastoo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 17/847,359

(22) Filed: Jun. 23, 2022

Related U.S. Application Data (60) Provisional application No. 63/349,370, filed on Jun. 6, 2022.

(51) Int. Cl.
*G06F 1/20* (2006.01)
*G06F 11/30* (2006.01)

(52) U.S. Cl.
CPC .......... *G06F 1/206* (2013.01); *G06F 11/3037* (2013.01); *G06F 11/3062* (2013.01)

(58) Field of Classification Search
CPC ....................................................... G06F 1/206
See application file for complete search history.

(56) References Cited

U.S. PATENT DOCUMENTS

| 8,762,097 | B2 | 6/2014 | Millet | |
|---|---|---|---|---|
| 10,475,485 | B2 | 11/2019 | Curtis et al. | |
| 11,231,760 | B1 | 1/2022 | Gu et al. | |
| 2008/0043807 | A1* | 2/2008 | Yazawa | G06F 1/324 374/E1.001 |
| 2012/0243574 | A1* | 9/2012 | Walker | G01K 7/425 374/176 |

(Continued)

FOREIGN PATENT DOCUMENTS

| CN | 111158978 A | * | 5/2020 |
|---|---|---|---|
| JP | 2016163512 A | * | 9/2016 |

OTHER PUBLICATIONS

Song Liu, Brian Leung, Alexander Neckar[†1], Seda Ogrenci Memik, Gokhan Memik, Nikos Hardavellas; "Hardware/Software Techniques for DRAM Thermal Management"; In Proceedings of the 17th IEEE International Symposium on High Performance Computer Architecture (HPCA), 2011; 11 pages.

(Continued)

*Primary Examiner* — Suresh Suryawanshi
(74) *Attorney, Agent, or Firm* — Kowert, Hood, Munyon, Rankin & Goetzel, P.C.

(57) ABSTRACT

A system includes one or more memory circuits and one or more sensor circuits that are separate from the memory circuits. A temperature estimation circuit estimates a temperature of the memory circuits based on sensor measurements from the sensor circuits and based on an empirically-derived relationship between the temperature and the sensor measurements. The temperature estimate is finer in granularity than a temperature indication provided by the memory circuits. For example, a given temperature indication value covers a range of 5 degrees Celsius, while the temperature estimate may be any integer temperature value or a decimal temperature value (e.g., to tenths or hundredths of degrees C.). A power control circuit in the system uses the temperature estimate to control a rate at which one or more agent circuits in the system generate memory requests to the memory circuit, which may control the temperature of the memory circuits.

20 Claims, 6 Drawing Sheets

(56) References Cited

U.S. PATENT DOCUMENTS

| | | | |
|---|---|---|---|
| 2014/0358318 A1* | 12/2014 | Lin | G06F 1/206 |
| | | | 700/300 |
| 2014/0369110 A1* | 12/2014 | Cho | G11C 11/40626 |
| | | | 365/222 |
| 2020/0174535 A1* | 6/2020 | Holmstrom | G06F 3/0653 |
| 2020/0409842 A1 | 12/2020 | Roh | |
| 2022/0011960 A1 | 1/2022 | Tan et al. | |
| 2023/0004310 A1* | 1/2023 | Kondo | G11C 16/22 |

OTHER PUBLICATIONS

Jiang Lin, Hongzhong Zheng, Zhichun Zhu, Howard David and Zhao Zhang; "Thermal Modeling and Management of DRAM Memory Systems"; ISCA'07, Jun. 9-13, 2007, San Diego, California, USA. Copyright 2007 ACM 978-1-59593-706-3/07/0006, 11 pages.

* cited by examiner

MEMORY THERMAL PROTECTION

This application claims benefit of priority to U.S. Provisional Patent Application Ser. No. 63/349,370, filed on Jun. 6, 2022. The above application is incorporated by reference in its entirety.

BACKGROUND

Technical Field

Embodiments described herein are related to integrated circuits and, more particularly, thermal control to protect memory circuits such as dynamic random access memory (DRAM) circuits.

Description of the Related Art

Digital systems include various integrated circuits ("ICs" or "chips") such as ICs integrating processors and sometimes other circuits such as memory controllers and peripherals, forming a "system on a chip" (SOC), memory ICs (e.g., static RAM (SRAM), DRAM, etc.), power management unit (PMU) ICs (PMICs) supplying power to other ICs, various peripheral ICs, and various other electrical components such as disk drives, adapter cards, and the like. All of these ICs and other electrical components consume power and generate heat. The heat is typically dissipated into the surround physical structure and/or through air movement (either naturally or forced air using a fan or fans). Part of the system design involves determining how much heat could be generated and how to dissipate that heat and/or control the rate of heat generation so that the electrical components remain within temperature limit specifications.

For example, DRAM chips can face long term reliability problems if operated at high temperature for long periods of time. The loss of reliability in the DRAM can negatively impact operation of the system. Some DRAM chips include self-protect circuitry that automatically terminates DRAM operation at elevated temperatures until the temperature decreases to a safer level. The self-protect features can occur at inopportune times and cause undesirable operation in other parts of the system (e.g., underrun in the video display section of the system or other "real time" sections of the system).

BRIEF DESCRIPTION OF THE DRAWINGS

The following detailed description refers to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In an embodiment, memory circuits such as DRAM chips provide an indication of temperature in the form of a memory refresh code, which is provided from mode register 4 (MR4) according to the double data rate (DDR) DRAM standards promulgated by the JEDEC Solid State Technology Association. The memory refresh code specifies how frequently the memory needs to be refreshed, and corresponds to DRAM die temperature. However, the MR4 codes are a coarse-grained indication: Each code corresponds to a range of 5 degrees Celsius (C). Such a coarse grain temperature measurement, if used in the context of a thermal control mechanism, is likely to cause oscillation in the control system. Oscillation is inefficient and may also produce an undesirable user experience. For example, if the control system is used to control the speed (e.g., revolutions per minute, or "RPMs") of a cooling fan, oscillation in the control system would lead to oscillation between two fan speeds. The audible changes in fan speed could be heard by the user.

In an embodiment, a system may include one or more memory circuits and one or more sensor circuits that are separate from the memory circuits. In an embodiment, a temperature estimation circuit estimates a temperature of the one or more memory circuits based on sensor measurements from the one or more sensor circuits and based on an empirically-derived relationship between the temperature and the sensor measurements. The temperature estimate may be finer in granularity than a temperature indication provided by the memory circuits. For example, a given temperature indication value may cover a range of 5 degrees C. in the case of a DRAM chip, while the temperature estimate may be any integer temperature value or even a more continuous, finer grain temperature value (e.g., to tenths or hundredths of degrees C.). A power control circuit in the system may use the temperature estimate to control a rate at which one or more agent circuits in the system generate memory requests to the memory circuit, which may control the temperature of the memory circuits by reducing the read and write activity in the memory circuits.

The empirically-derived relationship may be determined in a variety of ways. For example, in an embodiment, an instance of the system may be instrumented with temperature sensors (e.g., thermocouples or any other temperature sensors) on the DRAM memory devices to measure the temperature during operation. In this case, the temperature measured is the "case" temperature: The temperature at the surface of the package containing the DRAM memory devices. The case temperature is correlated to the temperature of the DRAM chip itself (e.g., the semiconductor die temperature, or more briefly, die temperature), but may typically be lower than the die temperature as heat radiates in several directions away from the die. However, the case temperature may be measured at a finer grain than the temperature indicated by the MR4 code. The case temperature may be sampled at a regular rate during operation, and other sensors in the system may be sampled at approximately the same time. For example, other sensors may be sampled at the same rate as the case temperature, and approximately synchronized with the sampling of the case temperature although there may be different delays in sampling various sensors and the case temperature due to differing access mechanisms and/or different paths to access the sensors. Because temperature changes relatively slowly compare to the clock frequencies of devices in the system, minor differences in sample times generally do not affect the correlation of the approximately synchronized samples to each other.

The sampled case temperatures and other sampled sensor measurements may be used to construct a model (e.g., a linear regression model) that estimates or predicts the case temperature from the other sensor measurements. These other sensors may be available to be sampled in the system during normal operation (e.g., in a system that has not been instrumented with the thermocouples). Another model may be used to generate an offset that correlates the case temperature and the die temperature, and the offset may be used to predict or estimate the die temperature. The estimated die temperature may be used by a power control circuit to control various agent circuits in the system, reducing a rate at which the memory circuits are accessed when the die temperature is elevated. Because the estimated die temperature is finer grain than the MR4 codes, oscillation in the control operation may be less likely.

In an embodiment, the thermal control circuit implements the model. Based on the model, the thermal control circuit is configured to estimate the DRAM temperature and provide a fine grain (e.g., continuous, or to a granularity of degrees, tenths of a degree, etc.) signal input to the control mechanism. As mentioned previously, a linear regression model may be used. For example, in an embodiment, an autoregressive with extra input (ARX) ARX model is used. The ARX model may be a least-squares error approach. However, generally any linear regression model can be used (e.g., autoregressive moving average (ARMA) models, autoregressive moving average exogenous (ARMAX) models, etc.) Non-linear regression models may be used as well. The resulting model produces a temperature estimate that remains within the corresponding MR code range for a high percentage of the time and also matches the temperature at the transition points between the MR codes (when the actual temperature is known to be the maximum temperature of the lower MR code range/minimum temperature of the higher MR code range).

In an embodiment, the MR codes may be used as a backup input to the thermal control circuit. For example, if the temperature estimate from the model is lower than the lowest temperature that the MR code could indicate (the minimum temperature of the corresponding temperature range), the MR code-based temperature may override the estimated temperature. An additional backup mechanism, some embodiments, may include providing the MR code (or a temperature mapped therefrom) as an input to a thermal shutdown control circuit, which may be configured to force a shutdown of the system to protect the memory circuits from continued high temperature operation. Other embodiments may use the MR code as an input to the thermal shutdown control circuit without the backup mechanism of overriding the temperature estimate as an input to the power control circuit.

In an embodiment, the target temperature for the thermal control circuit may be close to the temperature used to signal thermal shutdown (e.g., the target temperature may be about 99 degrees C. and the thermal shutdown temperature may be 100 degrees C.). However, the existence of the thermal control circuit may permit the thermal shutdown to be determined over a longer time period, e.g., multiple samples with the temperature at or above the thermal shutdown temperature. That is, the thermal shutdown may be signaled less rapidly than might otherwise be implemented in the absence of the thermal control circuit based on the estimated temperature. For example, N consecutive samples of the MR code exceeding the thermal shutdown temperature may be used as a trigger for the thermal shutdown control circuit, where the sample rate for the MR code may be the same as the sample rate for the sensors and N is an integer greater than 1. In an embodiment, the sample rate may be 1 second, although sample rates of 100 milliseconds, 10 milliseconds, etc. may be used or even lower sample rates such as more than one second.

Figure 1:
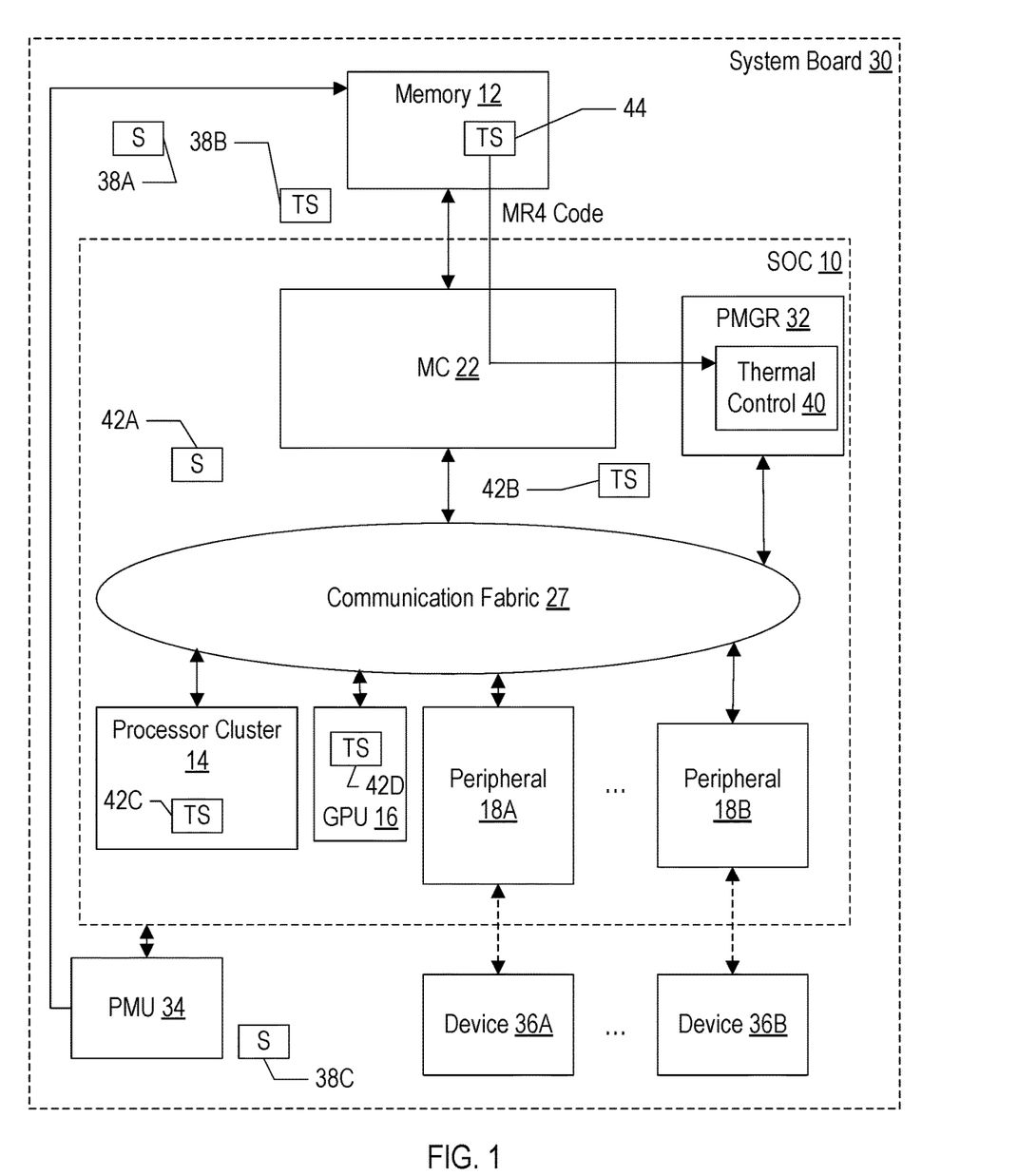
FIG. 1 is a block diagram of one embodiment a system including an SOC, memory, a system board, and various sensors on the board and on the SOC.

Turning now to FIG. 1, a block diagram of one embodiment of a portion of a system is shown. The portion shown in FIG. 1 includes a system board 30 on which various system components are mounted. The system board 30 may be a printed circuit board (PCB), for example, comprising layers of wiring and insulation to electrically connect the components mounted on the board. The system board 30 may also be referred to as a main logic board (MLB). In the illustrated embodiment, the components mounted on the board may include a system on a chip (SOC) 10, a power management unit (PMU) 34, one or devices such as devices 36A-36B, one or more sensor circuits 38A-38C, and one or more memory circuits 12 (e.g., DRAMs). The PMU 34 is coupled to the SOC 10 and the memory circuits 12 in the illustrated embodiment. The PMU 34 may further be coupled to the devices 36A-36B and/or various sensor circuits 38A-38C, or there may be additional PMUs to provide power to such other components. The devices 36A-36B and the memory circuits 12 are coupled to the SOC 10, and the sensor circuits 38A-38C may also be coupled to the SOC 10 to permit sampling of the sensor circuits 38A-38C by the SOC 10. The PMU 34 and the devices 36A-36B may comprise integrated circuit chips (ICs) and optionally other components (e.g., passive components such as capacitors, inductors, and resistors, and active components such as discrete transistors, etc.). The sensor circuits 38A-38C may include any type of sensor circuits and may comprise integrated circuits and/or discrete components. For example, sensor circuit 38B may be a temperature sensor circuit. Other sensor circuits may include power sensor circuits (e.g., the sensor circuit 38C may be one or more power sensor circuits configured to sense power deliver by the PMU 34).

In FIG. 1, a portion of the internal components of the SOC 10 is shown, for one embodiment. While an SOC embodiment is used as an example herein, systems comprising multiple integrated circuits coupled to a communication fabric may be used in other embodiments. In FIG. 1, the SOC 10 is coupled to the memory circuit(s) 12 (more briefly, the memory 12). As implied by the name, the components of the SOC 10 may be integrated onto a single semiconductor substrate as an integrated circuit "chip." In the illustrated embodiment, the components of the SOC 10 include at least one processor cluster 14, at least one graphics processing unit (GPU) 16, one or more peripheral components such as peripheral components 18A-18B (more briefly, "peripherals"), a memory controller circuit 22 (more briefly, "memory controller"), a power manager circuit (PMGR) 32, and a communication fabric circuit 27 (more briefly, "communication fabric" or simply "fabric"). The components 14, 16, 18A-18B, 22, and 32 may all be coupled to the communication fabric 27. The memory controller 22 may be coupled to the memory 12 during use. In some embodiments, there may be more than one memory controller coupled to a corresponding memory. The memory address space may be mapped across the memory controllers in any desired fashion in such embodiments. In the illustrated embodiment, the processor cluster 14 may include a plurality of processors. The processors may form the central processing units (CPU(s)) of the SOC 10. The PMGR 32 may include a thermal control circuit 40. Also shown in FIG. 1 are various sensor circuits 42A-42D that are integrated into the SOC 10. Similar to the sensor circuits 38A-38C, the sensor circuits 42A-42D may be any type of sensor circuit including temperature sensors, power sensors, etc.

The SOC 10 may include various agent circuits that are configured to generate memory requests for data stored in the memory 12. For example, the processors in the processor cluster 14, the GPU 16, and the peripherals 18A-18B may be examples of agent circuits. Generally, an agent circuit may be any circuit that is configured to generate memory read and write operations.

The placement of the sensor circuits 38A-38C and 42A-42D in FIG. 1 may be representative of the physical location of the sensor circuits 38A-38C and 42A-42D. Thus, as illustrated in FIG. 1, the sensor circuits 38A-38C and 42A-42D are separate from the memory circuit(s) 12. The sensor circuit 38B may be a temperature sensor circuit physically located near the memory circuit(s) 12, but still not part of the memory circuit(s) 12. For example, the temperature sensor circuit 38B may be mounted on the system board 20 physically near where the memory circuit(s) 12 are mounted. In an embodiment, the temperature sensor circuit 38B may be the nearest temperature sensor circuit to the memory circuit(s) 12 in the system. The temperature sensor circuit 38B may be one of the sensor circuits that is used by the thermal control circuit 40 to estimate the temperature of the memory circuit(s) 12. Similarly, the temperature sensor circuit 42B may be the nearest temperature sensor circuit on the SOC 10 to the memory controller 22. Since the memory controller 22 controls the memory circuit(s) 12, the temperature of the memory controller 22 may be correlated to the temperature of the memory circuit(s) 12. Accordingly, in an embodiment, the temperature sensor circuit 42B may be one of the sensor circuits used by the thermal control circuit 40 to estimate the temperature of the memory circuit(s) 12. Temperature sensor circuits 42C-42D, on the other hand, may be located within the processor cluster 14 and the GPU 16.

Other sensor circuits may be correlated to the temperature of the memory circuit(s) 12 as well. For example, the power sensor circuit 38C may sense power delivered by the PMU 34. The measured power may be correlated to the power consumed by the memory circuit(s) 12. In an embodiment, the power sensor circuit 38C may directly measure the power delivered on the power supply rail to the memory circuit(s) 12 (not shown in FIG. 1). In cases where the power supply rail to the memory circuit(s) 12 serves only the memory circuit(s) 12, the measured powered power may be directly correlated to the power consumed in the memory circuit(s) 12, and thus may be correlated to the temperature of the memory circuit(s) 12. In other embodiments, the measured power may be indirectly correlated to the memory circuit(s) 12. For example, the measured power may be measured from a portion of the PMU 34 that is often on when the memory circuit(s) 12 are consuming high power and often off when the memory circuit(s) 12 are not consuming high power.

The memory 12 may include a temperature sensor circuit 44 as well (or, in the case of multiple memory circuits, each memory circuit may include a temperature sensor circuit 44). From the temperature detected by the temperature circuit 44, the memory circuit 12 may generate the MR4 code and may transmit the MR4 code to the memory controller 22. The MR4 code may, for example, be transmitted in response to a read of the MR4 register by the memory controller 22. The memory controller 22 may use the MR4 code to control refresh rates. Additionally, the memory controller 22 may be configured to transmit the MR4 code to the thermal control circuit 40.

The PMGR 32 may be configured to control power states in the SOC 10, including which components are powered up or powered down. Additionally, the PMGR 32 may include the thermal control circuit 40 to control operation of the various agent circuits when the estimated temperature of the memory circuit(s) 12 is elevated. For example, the thermal control circuit 40 may adjust various operating parameters of the agent circuits (e.g., clock frequency of the clocks for the agent circuits, supply voltage levels for the agent circuits, logical parameters such as rate limiters for memory transactions issued to the memory circuit(s) 12, etc.). The PMGR 32 may be configured to control the supply voltage magnitudes requested from the PMU 34. There may be multiple supply voltages generated by the PMU 34 for the SOC 10. For example, there may be a supply voltage for the processor cluster 14 and at least one supply voltage for the rest of the SOC 10 outside of the processor cluster 14. In an embodiment, the same supply voltage may serve components of the SOC 10 outside of the processor cluster 14 and power gating may be employed based to control one or more independent power domains served by the power supply voltage. There may be multiple supply voltages for the rest of the SOC 10, in some embodiments. In some embodiments, there may also be a memory supply voltage for various memory arrays in the processor cluster 14 and/or the SOC 10. The memory supply voltage may be used with the voltage supplied to the logic circuitry, which may have a lower voltage magnitude than that required to ensure robust memory operation. The PMGR 32 may be under direct software control (e.g., software may directly request the power up and/or power down of components) and/or may be configured to monitor the SOC 10 and determine when various components are to be powered up or powered down. Various power states within a component (e.g., power states of the processors in the processor cluster 14) may be controlled via the PMGR 32, as well as the sequencing of changes to power states, different request voltage and frequencies, etc.

As mentioned above, the thermal control circuit 40 may be coupled to various sensor circuits 38A-38C and 42A-42D to serve as inputs to estimate the memory circuit temperature. Not all of the sensor circuits 38A-38D and 42A-42D need be used in the temperature estimation, however. The sensor circuits 38A-38C, external to the SOC 10, may be accessed via pins on the SOC 10 (e.g., dedicated signals), or through an interface to which the sensor circuits 38A-38C are coupled (e.g., system power management interface (SPMI), universal serial bus (USB), peripheral component interconnect (PCI), etc.).

As mentioned above, the processor cluster 14 may include one or more processors that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc.

Accordingly, the processors may also be referred to as application processors. Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The GPU 16 may include circuitry configured to execute a graphics instruction set designed to facilitate graphics operations (e.g., rendering, such as shading, texturing, etc.). The GPU 16 may comprise multiple GPU cores to allow for parallel processing of graphical data, in an embodiment.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18A-18B (collectively, peripherals 18) may be any set of additional hardware functionality included in the SOC 10. For example, the peripherals 18 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The interconnection to external devices (e.g., devices 36A-36B) is illustrated by the dashed arrows in FIG. 1 that extends external to the SOC 10. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as the processors 30 in each processor cluster 14 may vary from embodiment to embodiment. Additionally, the number of processors 30 in one processor cluster 14 may differ from the number of processors 30 in another processor cluster 14 when multiple processor clusters are included. There may be more or fewer of each component/subcomponent than the number shown in FIG. 1.

Figure 2:
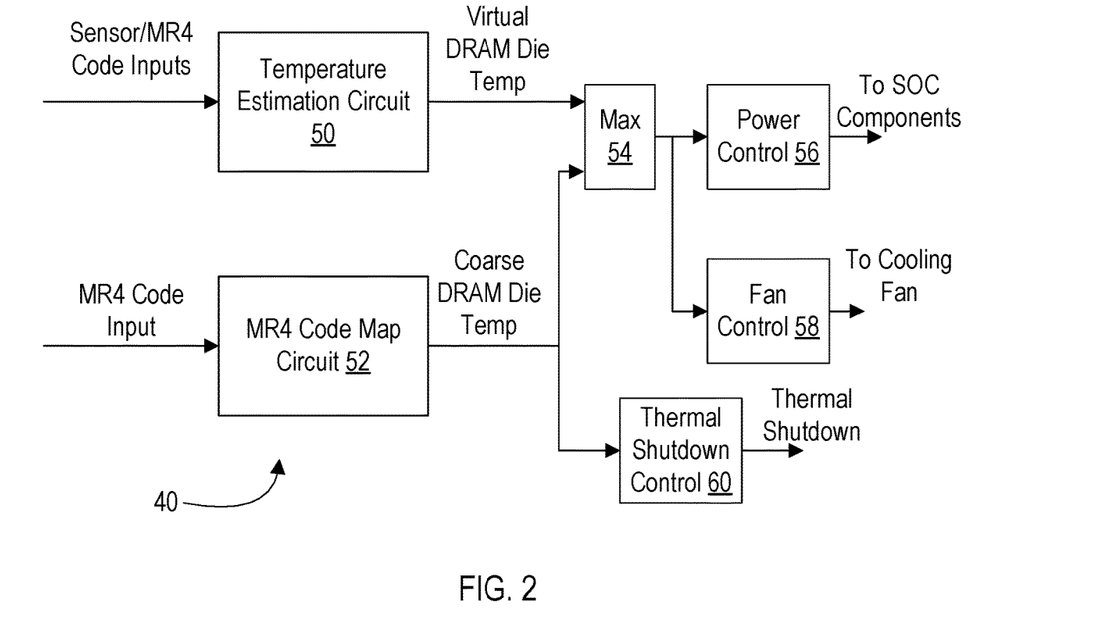
FIG. 2 is a block diagram of one embodiment of a thermal control circuit for the SOC.

Turning now to FIG. 2, a block diagram of one embodiment of the thermal control circuit 40 is shown. In the embodiment of FIG. 2, the thermal control circuit may include a temperature estimation circuit 50, an MR4 code map circuit 52, a max select circuit 54, a power control circuit 56, a fan control circuit 58, and a thermal shutdown control circuit 60. The temperature estimation circuit 40 is coupled to the one or more sensor circuits and is configured to receive the measurements from the one or more sensor circuits, and is coupled to the memory controller 22 and is configured to receive the MR4 code input. The temperature estimation circuit 50 is configured to generate an estimated memory die temperature ("Virtual DRAM Die Temp" in FIG. 2). The MR4 code map circuit 52 is coupled to the MR4 code input and is configured to provide a coarse memory die temperature ("Coarse DRAM Die Temp" in FIG. 2). The max circuit 54 is coupled to the temperature estimation circuit 50, the MR4 code map circuit 52, the power control circuit 56, and the fan control circuit 58. The thermal shutdown control circuit 60 is coupled to the MR4 code map circuit 52. The power control circuit 56 is coupled to various SOC components (e.g., agent circuits) and the fan control circuit 58 is coupled to a cooling fan in the system.

The temperature estimation circuit is configured to estimate a temperature of a given memory circuit of the one or more memory circuits 12 based on an empirically-derived relationship between the one or more measurements and the temperature of the given memory circuit (e.g., the linear regression model, or any of the other models described above). The MR4 code may be a temperature indication representing an actual temperature of the given memory circuit at a first granularity (e.g., 5 degrees C.) and the estimated temperature is a second granularity that is finer than the first granularity.

In the illustrated embodiment, the max circuit 54 is configured to select between the estimated temperature and the actual temperature as generated by the MR4 code map circuit 52. In other embodiments, the max circuit 54 may not be used and the estimated temperature may be input to the power control circuit 56 and the fan control circuit 58. Thus, the power control circuit 56 and the fan control circuit 58 may be coupled to the temperature estimation circuit 50, either through the max circuit 54 or directly.

The power control circuit 56 is configured to control a rate at which memory transactions are generated by the agent circuits, based on the estimated temperature. The power control circuit 56 may control the rate in a variety of fashions, as discussed above.

The fan control circuit 58 may control the cooling fan in the system (e.g., generating a speed control for the fan). The fan control circuit 58 may generate the fan control based on the estimated temperature as well. In an embodiment, the cooling fan may include control circuitry (or other control circuitry may be included in the system) to receive the fan control from the fan control circuit 58 and other fan control circuits based on other sources of heat in the system. The control circuitry may determine a final fan speed from the various sources. The fan control circuit 58 may not be included, in other embodiments.

The thermal shutdown control circuit 60 may be configured to issue a thermal shutdown request based on the MR4 code (e.g., as mapped to a coarse actual temperature through the MR4 code map circuit 52). Particularly, as mentioned above the thermal shutdown control circuit may be configured to detect that the temperature indication indicates an actual temperature that is greater than or equal to a threshold temperature for N consecutive samples of the temperature indication, where N is an integer greater than one. The thermal shutdown control circuit 60 may be configured to issue the thermal shutdown request responsive to the detection of the N consecutive samples. The threshold may be a temperature above which, if permitted over long periods of time, may affect the reliability of the memory circuits 12. The threshold may include guardbanding as well, so it may be lower than the temperature at which reliability of the memory circuits 12 is impacted. Also, because of the coarse grain nature of the MR4 code, there is some amount of guardband based on the mapping of the MR4 code to the actual temperature.

In an embodiment, the MR4 code map circuit 52 may be configured to map the temperature indication to a temperature value that is used as the actual temperature. In some embodiments, the MR4 code map circuit 52 may be configured to map a given MR4 code to the lowest temperature value in the range represented by that MR4 code. For example, the MR4 code that represents 100 degrees C. to 105 degrees C. may be mapped to 100 degrees C. In an embodiment, the MR4 codes that are lower than the target temperature for the power control circuit 56 may not affect the operation of the power control circuit 56 or the thermal shutdown control circuit 60, and thus may be mapped to 0 degrees C.

As previously mentioned, the estimated temperature (Virtual DRAM Die Temp in FIG. 2) and the actual temperature (Coarse DRAM Die Temp in FIG. 2) are die temperatures of the memory circuits 12 (e.g., DRAM die temperatures).

Figure 3:
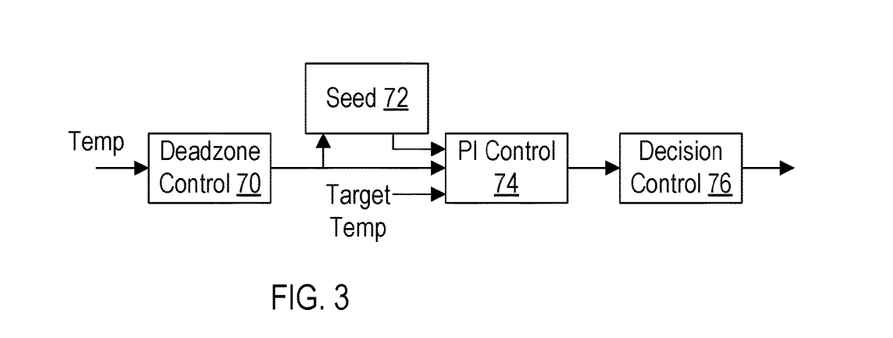
FIG. 3 is a block diagram of one embodiment of a power control circuit shown in FIG. 2.

Turning next to FIG. 3, a block diagram of one embodiment of the power control circuit 56 is shown. In the illustrated embodiment, the power control circuit 56 comprises a deadzone control circuit 70, a seed circuit 72, a proportional integral (PI) control circuit 74, and a decision control circuit 76. The deadzone control circuit 70 is coupled to the temperature input and to the seed circuit 72 and PI control circuit 74. The Seed circuit 72 is further coupled to the PI control circuit 74, which is also coupled to a target temperature input. The PI control circuit 74 is coupled to the decision control circuit 76.

The deadzone control circuit 70 may be configured to smooth the operation of the power control circuit 56 by desensitizing the power control circuit 56 to input values that do not require control effort (e.g., lower temperatures). The seed circuit 72 may be configured to initialize the PI control circuit 74 after a power up event, reset, or the like where the history (integral portion of the control) is not present yet. The PI control circuit 74 may provide proportional-integral control based on the difference between the temperature input and the target temperature. While PI control is used in this embodiment, other embodiments may include derivative control (PID), are any subset of PID control. Other control circuits may implement different control mechanisms as well. The decision control circuit 76 may determine how to divide the control effort indicated by the PI control circuit 74 among the agent circuits. For example, the decision may be based on previous allocations of control effort and/or a programmable policy provided by software executing on the SOC 10, in various embodiments.

The fan control circuit 58 may have a similar structure to that shown in FIG. 3. The PI control circuit may be configured to generate fan control effort rather than agent control effort, and the decision control circuit may convert the control effort into fan speed.

Figure 4:
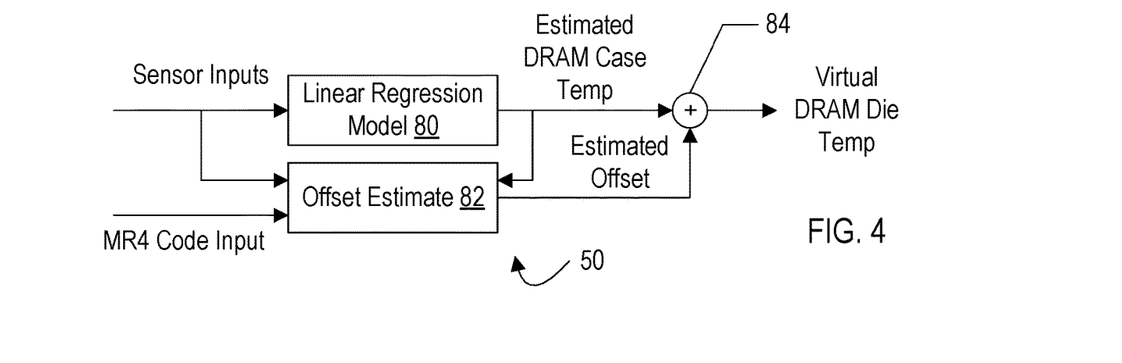
FIG. 4 is a block diagram of one embodiment of a temperature estimation circuit shown in FIG. 2.

Turning next to FIG. 4, a block diagram of one embodiment of the temperature estimation circuit 50 is shown. In the embodiment of FIG. 4, the temperature estimation circuit 50 includes a linear regression model circuit 80, an offset estimate circuit 82, and an adder circuit 84. The linear regression model circuit 80 is coupled to the inputs from the sensor circuits, and the offset estimate circuit 82 is coupled to the inputs from the sensor circuits and the MR4 code. The output of the linear regression model 80 is the estimated case temperature for the memory circuit, and is also coupled to the offset estimate circuit 82 and the adder circuit 84. The offset estimate circuit 82 is configured to output an estimated offset to the adder circuit 84. The adder circuit 84 is configured to add the estimated case temperature to the estimated offset, producing the die temperature estimate (Virtual DRAM Die Temp in FIG. 4).

As mentioned above, a linear regression model may be generated from the observed memory case temperatures and the corresponding sensor measurements. The linear regression model circuit 80 may implement the linear regression model, operating on the sensor inputs to generate the estimated case temperature. Similarly, the offset estimate may be based on the observed differences between the case temperatures and the actual die temperatures at the transition points between MR codes (when the die temperature is known with reasonable accuracy to be the temperature at the boundary between the MR codes). The offset estimate circuit 82 may implement the empirically-derived offset model.

It is noted that, when there is more than one memory circuit 12, there may be more than on MR4 code. The MR4 code representing the highest temperature range of the reported codes may be used in the above description.

Figure 5:
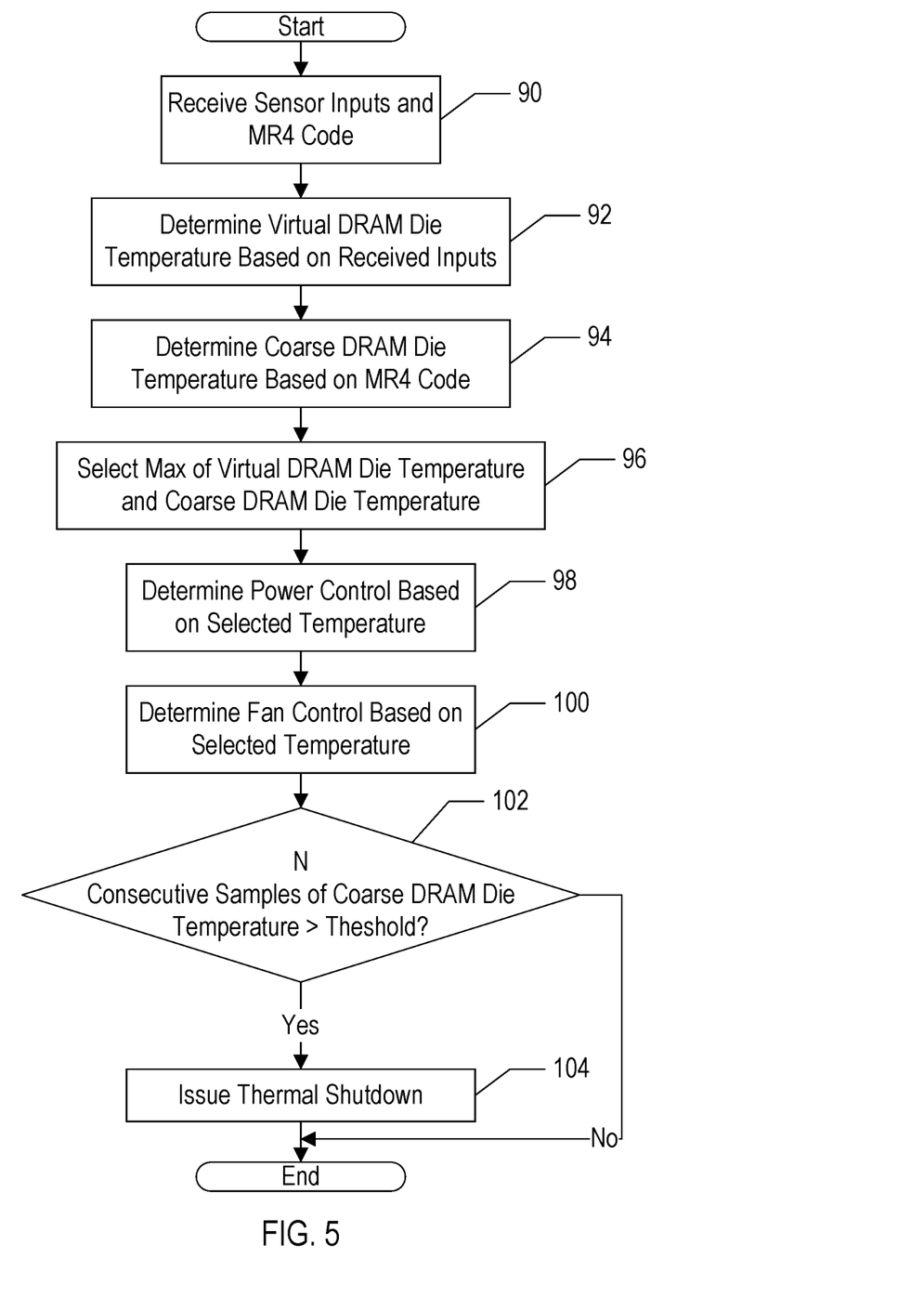
FIG. 5 is a flowchart illustrating operation of one embodiment of the thermal control circuit shown in FIG. 2.

FIG. 5 is a flowchart illustrating one embodiment of the operation of the thermal control circuit 40. While the blocks are shown in a particular order for ease of understanding, other orders may be used. Blocks may be performed in parallel in combinatorial logic circuitry in the thermal control circuit 40. For example, blocks 92 and 94 may be performed in parallel, blocks 98 and 100 may be performed in parallel, and blocks 102 and 104 may be performed in parallel with blocks 92-100. Blocks, combinations of blocks, and/or the flowchart as a whole may be pipelined over multiple clock cycles. The thermal control circuit 40 and more specifically components thereof may be configured to implement the operation shown in FIG. 5.

The thermal control circuit 40 may receive the sensor measurement inputs and the MR4 code (block 90). The inputs are received at the implemented sample times (e.g., once per second). Thus, the operation of the thermal control circuit 40 illustrated in FIG. may occur once per sample of the inputs. The temperature estimation circuit 50 may be configured to estimate the memory circuit die temperature (e.g., the virtual DRAM die temperature) based on the receive inputs (block 92). The MR4 code map circuit 52 may be configured to determine the coarse memory circuit die temperature (e.g., the coarse DRAM die temperature) based on the MR4 code (block 94). The max circuit 54 may be configured to select the maximum of the estimated memory circuit temperature and the coarse memory circuit die temperature (block 96) and may provide the selected temperature to the power control circuit 56 and the fan control circuit 58. The power control circuit 56 may be configured to determine the power control for the agent circuits based on the selected temperature (block 98). The fan control circuit 58 may be configured to determine the fan control based on the selected temperature (block 100).

The thermal shutdown control circuit 60 may receive the coarse memory circuit die temperature and may compare the temperature to the threshold. If the coarse memory circuit die temperature is greater than the threshold and the N−1 most recent samples of the coarse memory circuit die temperature were greater than the threshold (e.g., N consecutive samples were greater than the threshold: decision block 102, "yes" leg), the thermal shutdown control circuit may issue the thermal shutdown request (block 104). If not (decision block 102, "no" leg), the thermal shutdown request is not issued.

It is noted that the thermal control circuit 40 may be implemented as any form of hardware circuitry. For example, the thermal control circuit 40 may comprise combinatorial logic, clocked state storage such as registers, latches, etc., state machines, one or more processors and computer accessible media such as read only memory storing instructions which, when executed by the processors, implement the thermal control circuit, or any combination of processors/computer accessible media and other hardware circuitry.

Figure 6:
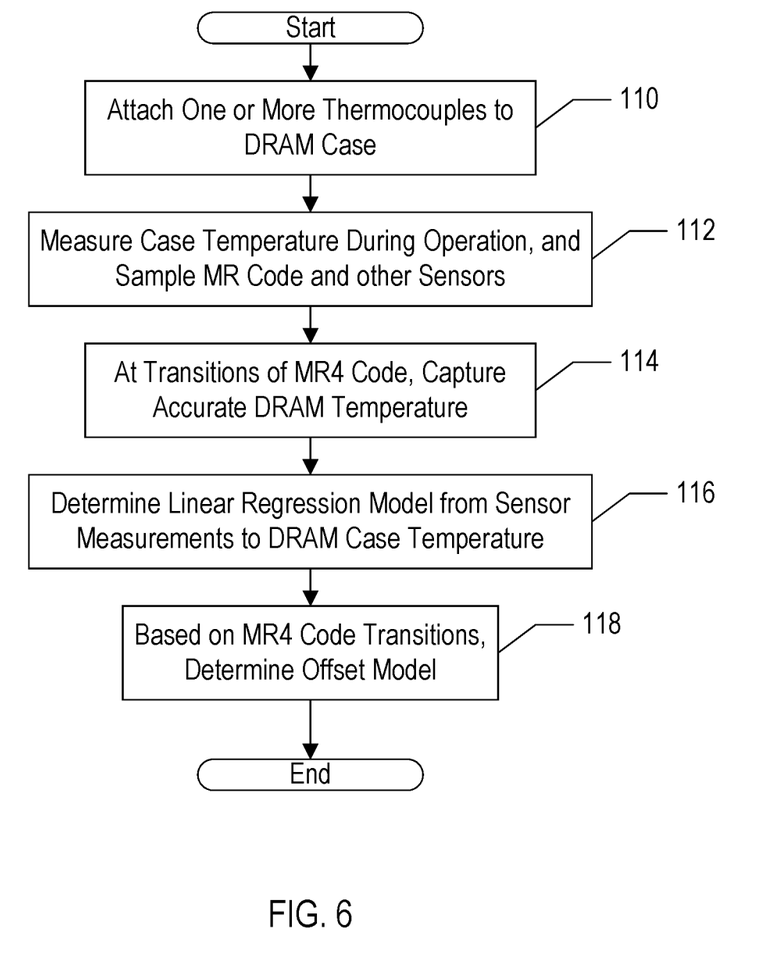
FIG. 6 is a flowchart illustrating one embodiment of developing a temperature estimation circuit.

FIG. 6 is a flowchart illustrating one embodiment of developing the temperature estimation model for the temperature estimation circuit 50. While the blocks are shown in a particular order for ease of understanding, other orders may be used.

In an embodiment, one or more thermocouples (or other temperature sensors) may be attached to the memory circuit case(s) (e.g., the DRAM case(s)) (block 110). The system may then be placed in operation, performing various tasks for a period of time. During operation of the system, the case temperature of the one or more memory circuits may be measured using the one or more thermocouples. Additionally, one or more sensor circuits in the system may be sampled in correlation with measuring the case temperature. During operation of the system, a temperature indication reported by the one or more memory circuits (e.g., the MR4 code) may be sampled in correlation with measuring the case temperature (block 112). The correlation may be, e.g., approximate synchronization as described previously. At times that the temperature indication (e.g., MR4 code) transitions between values, the actual, accurate memory circuit die temperature may be determined and captured (block 114). A temperature estimation model for the one or more memory circuits may be generated based on the recorded case temperatures and the sampled sensor circuit values. For example, a linear regression model may be generated which estimates case temperature from sensor measurements (block 116). Based on the MR4 code transition temperatures, as well as these sensor measurements and other data, the offset model may be determined (block 118).

Computer System

Figure 7:
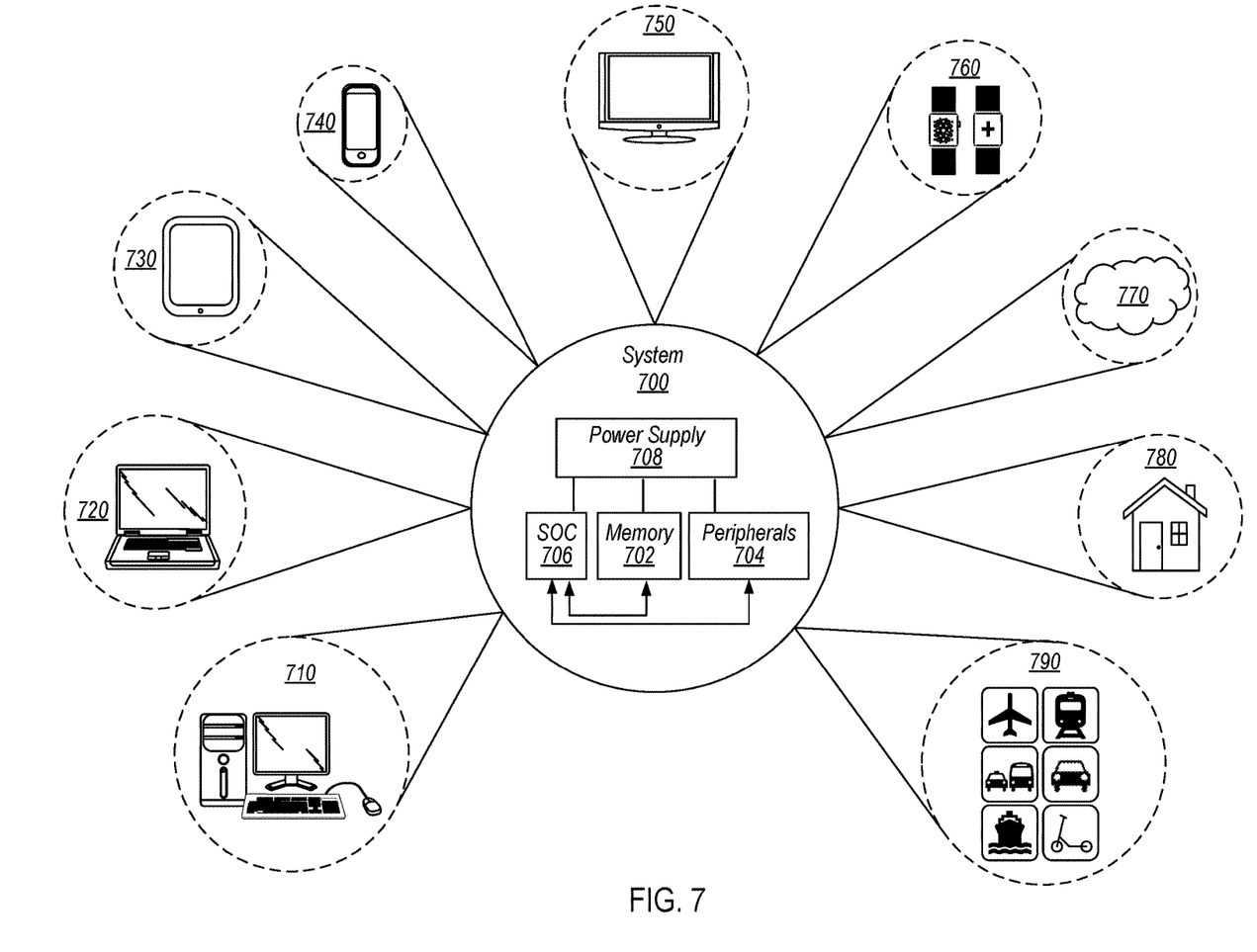
FIG. 7 is a block diagram of one embodiment of a system.

Turning next to FIG. 7, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC may be included (and more than one memory 702 may be included as well). The PMU 708 may include the PMU 34 shown in FIG. 1, in an embodiment. The memory 702 may include the memory circuits 12 illustrated in FIG. 1, in an embodiment. The SOC 706 may be an instance of the SOC 10 illustrated in FIG. 1, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.). The devices 36A-36B may be examples of peripherals 704, in an embodiment.

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation. The memory 702 may include the memory circuits 12, in an embodiment.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

Computer Readable Storage Medium

Figure 8:
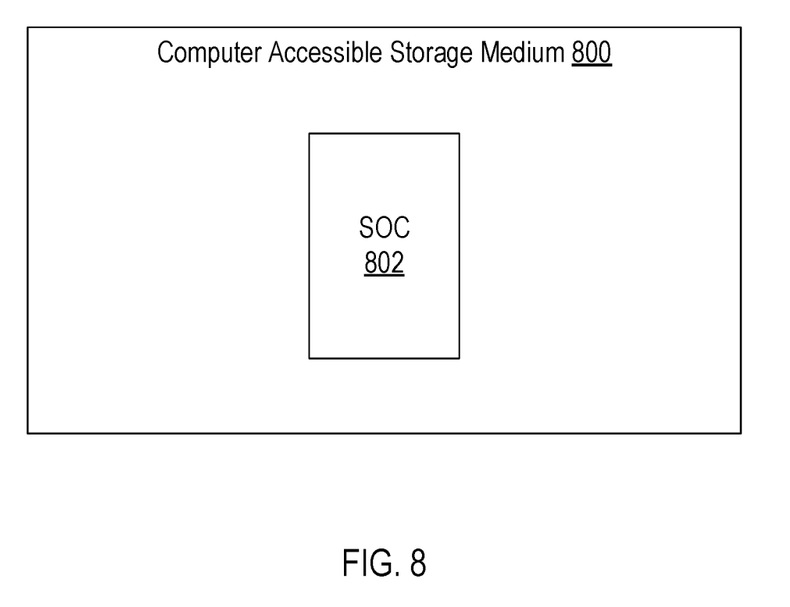
FIG. 8 is a block diagram of one embodiment of a computer accessible storage medium.

Turning now to FIG. 8, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 8 may store a database 804 representative of the SOC 706 (e.g., the SOC 10). Generally, the database 804 may be a database which can be read by a program and used, directly or indirectly, to fabricate the hardware comprising the SOC 706. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 1. In other embodiments, database 104 may represent more of the system as shown in FIG. 1 (e.g., the devices 36A-36B, the sensor circuits 38A-38C, the PMU 34, the system board 30, etc.) The database 804 may represent any portion of the above.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
   one or more agent circuits configured to generate memory requests for data stored in one or more memory circuits;
   one or more sensor circuits separate from the one or more memory circuits;
   a temperature estimation circuit coupled to the one or more sensor circuits and configured to receive one or more measurements from the one or more sensor circuits, wherein the temperature estimation circuit is configured to estimate a temperature of a given memory circuit of the one or more memory circuits based on an empirically-derived relationship between the one or more measurements and the temperature of the given memory circuit, wherein the given memory circuit is configured to report a temperature indication representing an actual temperature of the given memory circuit at a first granularity and the estimated temperature is a second granularity that is finer than the first granularity; and a power control circuit coupled to the temperature estimation circuit and the one or more agent circuits, wherein the power control circuit is configured, based on the estimated temperature, to control a rate at which memory transactions are generated.

2. The system as recited in claim 1 further comprising a thermal shutdown control circuit configured to receive the temperature indication configured to issue a thermal shutdown request to the system based on the temperature indication.

3. The system as recited in claim 2 wherein the thermal shutdown control circuit is configured to detect that the temperature indication indicates the actual temperature that is greater than or equal to a threshold for N consecutive samples of the temperature indication, wherein N is an integer greater than one, and wherein the thermal shutdown control circuit is configured to issue the thermal shutdown request responsive to the detection.

4. The system as recited in claim 1 further comprising a map circuit configured to map the temperature indication to a temperature value that is used as the actual temperature.

5. The system as recited in claim 1 wherein the one or more sensor circuits comprise at least one temperature sensor circuit.

6. The system as recited in claim 5 wherein the at least one temperature sensor circuit is physically located nearest the one or more memory circuits among temperature sensors in the system.

7. The system as recited in claim 1 wherein the one or more sensor circuits comprise at least one power sensor circuit.

8. The system as recited in claim 7 wherein the at least one power sensor circuit is configured to measure power consumption that is indirectly related to the power consumption of the one or more memory circuits.

9. The system as recited in claim 7 wherein the at least one power sensor circuit is configured to measure power consumed on a supply rail to the one or more memory circuits.

10. The system as recited in claim 1 wherein the one or more agent circuits, the temperature estimation circuit, and the power control circuit are integrated onto a single semiconductor substrate as an integrated circuit, and wherein at least one of the one or more sensor circuits is external to the integrated circuit.

11. The system as recited in claim 10 further comprising a circuit board, wherein the at least one of the one or more sensor circuits is mounted on the circuit board and the integrated circuit is mounted on the circuit board.

12. The system as recited in claim 10 wherein at least one additional sensor circuit of the one or more sensor circuits is integrated onto the integrated circuit.

13. The system as recited in claim 1 wherein the temperature indication is a mode register 4 (MR4) code reported by the given memory circuit of the one or more memory circuits.

14. The system as recited in claim 1 wherein the temperature indication is defined according to an industry standard specification.

15. The system as recited in claim 14 wherein the industry standard specification is a double data rate (DDR) dynamic random access memory (DRAM) standard promulgated by a JEDEC Solid State Technology Association.

16. An integrated circuit comprising:
one or more agent circuits configured to generate memory requests;
one or more memory controllers coupled to the one or more agent circuits and configured to receive the memory requests;
a temperature estimation circuit configured to receive one or more measurements from one or more sensor circuits, wherein the temperature estimation circuit is configured to estimate a temperature of a given memory circuit controlled by the memory controller, wherein the temperature estimation circuit is configured to estimate the temperature based on an empirically-derived relationship between the one or more measurements and the temperature of the given memory circuit, wherein the given memory circuit is configured to report a temperature indication representing an actual temperature of the given memory circuit at a first granularity and the estimated temperature is a second granularity that is finer than the first granularity; and
a power control circuit coupled to the temperature estimation circuit and the one or more agent circuits, wherein the power control circuit is configured, based on the estimated temperature, to control a rate at which memory transactions are generated.

17. The integrated circuit as recited in claim 16 further comprising a thermal shutdown control circuit configured to receive the temperature indication configured to issue a thermal shutdown request based on the temperature indication.

18. A method comprising:
during operation of a system, measuring a case temperature of one or more memory circuits using one or more thermocouples to generate recorded case temperatures;
during operation of the system, sampling a temperature indication reported by the one or more memory circuits in correlation with measuring the case temperature;
during operation of the system, sampling one or more sensor circuits in the system in correlation with measuring the case temperature;
during operation of the system, at times the temperature indication transitions between values, determining an actual temperature of the one or more memory circuits; and
generating a temperature estimation model for the one or more memory circuits based on the recorded case temperatures and the sampled sensor circuit values.

19. The method as recited in claim 18 wherein the temperature estimation model estimates the case temperature of the one or more memory circuits, and the method further comprises generating a temperature offset model based on the sampled temperature indications, the sampled sensor circuit values, and the recorded case temperatures.

20. The method as recited in claim 18 wherein the temperature estimation model generates a temperature estimate that matches a known temperature at a time of transition between the sampled temperature indications.

* * * * *